(12) United States Patent
DeLucas et al.

(10) Patent No.: US 8,304,241 B2
(45) Date of Patent: Nov. 6, 2012

(54) METHOD FOR DETERMINING CRYSTALLIZATION PARAMETERS AND APPARATUS FOR USE WITH THE SAME

(75) Inventors: Lawrence J DeLucas, Birmingham, AL (US); Wilbur W Wilson, Starkville, MS (US); Charles S Henry, Fort Collins, CO (US); Lisa Nagy, Birmingham, AL (US); David Johnson, Birmingham, AL (US)

(73) Assignees: The UAB Research Foundation, Birmingham, AL (US); Colorado State University Research Foundation, Fort Collins, CO (US); Mississippi State University, Mississippi State, MS (US)

( * ) Notice: Subject to any disclaimer, the term of this patent is extended or adjusted under 35 U.S.C. 154(b) by 0 days.

(21) Appl. No.: 13/307,973

(22) Filed: Nov. 30, 2011

(65) Prior Publication Data
US 2012/0077248 A1  Mar. 29, 2012

Related U.S. Application Data

(60) Division of application No. 11/939,243, filed on Nov. 13, 2007, now Pat. No. 8,080,421, which is a continuation-in-part of application No. PCT/US2006/018102, filed on May 10, 2006.

(60) Provisional application No. 60/679,495, filed on May 10, 2005.

(51) Int. Cl.
*G01N 31/00* (2006.01)

(52) U.S. Cl. ............ 436/4; 436/174; 117/11; 435/55
(58) Field of Classification Search .............. 436/4, 174; 117/11; 435/55
See application file for complete search history.

(56) References Cited

U.S. PATENT DOCUMENTS
6,974,678 B2    12/2005  Wilson et al.
2004/0129199 A1  7/2004  Hamrick et al.

OTHER PUBLICATIONS

DeLucas et al., "Protein crystallization: virtual screening and optimization", Progress in Biophysics and Molecular Biology, 88, 285-309 (2005).

*Primary Examiner* — Jill Warden
*Assistant Examiner* — Monique Cole
(74) *Attorney, Agent, or Firm* — Thomas G. Peterson; Nicholas J. Landau; Bradley Arant Boult Cummings LLP

(57) ABSTRACT

The present disclosure provides a method to allow a user to pre-screen numerous crystallization conditions in the crystallization space to identify those conditions with the highest probability of yielding crystals and high quality diffracting crystals. In one embodiment, the dilute solution thermodynamic virial coefficient, termed B, is used to aid in the determination crystallization conditions that increase the probability of producing crystals for the crystallant of interest. The present disclosure also provide methods for predicting solution conditions that generate beneficial solubility and/or stability conditions for a polypeptide of interest using the B parameter. Devices for use in the described methods are also described.

21 Claims, 9 Drawing Sheets

METHOD FOR DETERMINING CRYSTALLIZATION PARAMETERS AND APPARATUS FOR USE WITH THE SAME

CROSS-REFERENCE TO RELATED APPLICATIONS

This application is a divisional of U.S. application Ser. No. 11/939,243, filed on Nov. 13, 2007, which is currently pending, and which is incorporated by reference herein in its entirety. U.S. application Ser. No. 11/939,243 is a continuation-in-part of International Application No. PCT/US2006/018102, filed May 10, 2006, which claims the benefit of U.S. Provisional Application No. 60/679,495, filed May 10, 2005.

STATEMENT REGARDING FEDERALLY SPONSORED RESEARCH OR DEVELOPMENT

This work was funded by the government of the United States, particularly through National Institutes of Health grant numbers GM002407, GM081799, and GM076552; National Aeronautics and Space Administration grant number NCC8-246, and National Aeronautics and Space Administration grant number NAG8-1837.

FIELD OF THE DISCLOSURE

The present disclosure relates to the field of crystallography and protein solubility and stability. In particular the present disclosure relates to a method for determining at least one crystallization condition for polypeptide or other crystallant of interest or at least one solution condition that yield beneficial solubility or stability conditions for a polypeptide of interest and an apparatus for automation of the method.

BACKGROUND

Protein crystallization, whether for aqueous or membrane proteins, is a major bottleneck limiting determination of protein structure. A recent international survey of protein crystallization rates at 22 structural genomics centers around the world indicated that for 10,204 soluble proteins obtained, crystals were obtained for only 3,397 proteins. Of these 3,397 crystals, only 1,669 were of diffraction quality and a mere 1,352 structures were solved.

Several problems contribute to the low success rate described above for producing diffraction quality crystals. One involves the production of sufficient amounts of purified protein to be used in numerous crystallization experiments. Therefore, there is a need in the art for a method and apparatus to perform crystallization procedures using small amounts of protein. Second, is the ability to find the correct set of crystallization conditions for a particular protein. There are a huge number of variables that impact the crystallization process for a given protein. These factors include, but are not limited to: protein purity, protein dilution, protein homogeneity, protein stability, the flexibility of the protein itself, the selection of precipitating agent, the selection of buffer, the selection of pH, the selection of temperature, light, magnetism, gravity, atmosphere identity, atmospheric pressure, the selection of divalent anion, organic moment and the selection of additional additives to aid in crystallization. For membrane proteins, additional factors must be considered, such as, but not limited to, the type of lipid present, relative types and concentrations of detergent present, polar, apolar and amphipathic additives and limited protein quantity. Each of the above factors must be considered both alone and in combination, to determine a set of crystallization conditions that yield high quality diffracting crystals (i.e. optimal conditions). However, new high throughput testing systems have allowed scientists to test thousands of crystallization conditions for a given protein, suggesting that the large number of potential variables is not the only issue. Therefore, factors other than the multiplicity of crystallization conditions appear to be influencing the poor success rate of crystal production.

Therefore, the prior art is lacking and is in need of a method and apparatus to efficiently test and evaluate a wide range of crystallization conditions in the crystallization space for a given protein in order to determine crystallization conditions for said protein, and to test and evaluate a wide range of solubility conditions for a given protein in order to determine solubility conditions for said protein. In addition, it is also useful to determine solution conditions in which a protein will remain soluble e.g. solution condition that will not precipitate said protein.

BRIEF DESCRIPTION OF THE FIGURES

FIG. 4 shows crystalline images and corresponding crystallization conditions obtained using the incomplete factorial screen as compared crystalline images and corresponding crystallization conditions as predicted by the trained neural network.

DETAILED DESCRIPTION

Figure 1:
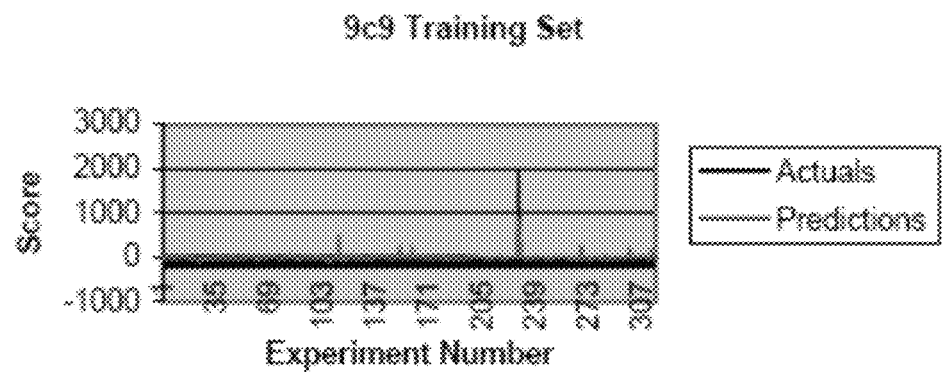
FIG. 1 illustrates a comparison of the crystallization scores between predicted and actual experiments using the training data used to train the neural network for the 9c9 protein.

The present disclosure provides an effective method to allow a user to pre-screen numerous crystallization conditions in the crystallization space to identify those conditions with the highest probability of yielding crystals and high quality diffracting crystals. Such a method will allow protein-specific screens to be created. In addition, as the body of crystallization conditions increases for individual proteins, it may be possible to define characteristic subsets of classes in these proteins that produce crystals under similar crystallization conditions. These characteristics can be used to produce crystallization classes of proteins and further aid in the ability to produce crystals from a variety of proteins. In addition, the present disclosure provides methods for the accurate determinations of solution conditions that generate beneficial solubility and/or stability conditions for a polypeptide of interest.

While the present disclosure is described with respect to protein crystallization, it should be appreciated that the methods and apparatus of the present disclosure can be used in the optimization of crystallization conditions for a variety of potential "crystallants" including but not limited to polypeptides, organic molecules, organometallic molecules, inorganic molecules, nanocrystals, and viruses. The inventive method of the present disclosure speeds structure-based drug design by expediting the crystallization of protein crystals, as well as by revealing the crystallization process itself, thus allowing investigation of variables important for crystallization. Furthermore, the method and apparatus of the present disclosure may also be used to determine the solution conditions that result in beneficial solubility and stability solubility for a polypeptide of interest. In one embodiment, the crystallization condition variables are selected for a particular polypeptide (sometimes referred to herein as the "polypeptide of interest") to be crystallized. The crystallization condition variables include, but are not limited to, protein purity, protein dilution, protein homogeneity, protein stability, flexibility of the protein, precipitating agent, concentration of precipitating agent, buffer, concentration of buffer, pH, temperature, light, magnetism, gravity, atmosphere identity, atmospheric pressure, divalent anion, organic moment, additives to aid in crystallization and a combination of any of the foregoing. Furthermore, for membrane proteins the crystallization condition variables may further include, but are not limited to, the type of lipid present, detergent, concentration of detergent, polar additives, apolar additives, amphipathic additives and a combination of any of the foregoing. These variables are used in an initial crystallization screening experiments and initial solubility and/or stability experiments. A number of methods may be used to select the variables and specific values for each variable in the initial crystallization screening experiment, such as, but not limited to, an incomplete factorial screen or a random screen. Each variable may have one or more specific values to be tested (for example the variable may be pH, with 4 pH values being tested for the pH variable). The variables may be selected as is known in the art. The number of values for each of the variables, when multiplied together, represents the permutation number (crystallization space) for a particular crystallization experiment for the crystallant of interest. A subset of the values for each of the variables is selected to perform a number of crystallization experiments. The number of values in the subset is less than the permutation number for the experiment and the subset is chosen to sample the entire crystallization space. The subset of values for a given variable is chosen as is known in the art. The results of the crystallization experiments performed are entered into a predictive crystallization function. The predictive crystallization function can then be used to generate a predicted outcome of the remaining experimental crystallization conditions based on the results of the actual experiments carried out using the subset described above. The same methodology applies to the determination of predicted solution conditions that result in beneficial solubility and/or stability conditions for a polypeptide of interest. A predicted positive outcome indicates a condition likely to produce a crystal from the crystallant of interest or a solution that is likely to produce beneficial solubility and/or stability for a polypeptide of interest. A predicted negative outcome indicates a condition that is not likely to produce a crystal from the crystallant of interest or a solution that that is likely to produce beneficial solubility and/or stability for a polypeptide of interest. The number of predicted outcomes will be the permutation number minus the number of values used in the subset.

In one embodiment, the predictive function is created by a neural network. The neural network is used to analyze the experimental crystallization or solubility/stability results. In one specific embodiment disclosed, the dilute solution thermodynamic virial coefficient, termed B, is used to aid in the prediction of crystallization conditions for the crystallant of interest. The B parameter may also be used independently to predict solution conditions that result in beneficial solubility and/or stability for a polypeptide of interest. The B parameter may be used: (1) to select the variables of interest, (2) to refine the individual values for each variable selected, (3) as a variable in the data used to train the neural network, (4) or to screen the predicted outcomes given by the predictive crystallization function to eliminate false positive outcomes from the results, or in possible combinations of the foregoing.

Such a method will minimize the amount of protein required for the screening process, increase the probability of obtaining crystals with each condition tested and increase the overall efficiency/cost effectiveness of the crystallization process. Furthermore, as data regarding the relationship of variables or specific combinations of different variables are associated with a large number of different proteins, the method will produce "crystallization classes" of proteins to allow a starting point for crystallization experiments.

As used herein, the term "polypeptide" refers to a polymer of amino acids without regard to the length of the polymer; thus, peptides, oligopeptides, and proteins are included within the definition of polypeptide. This term also does not specify or exclude chemical or post-expression modifications of the polypeptides of the invention, although chemical or post-expression modifications of these polypeptides may be included or excluded as specific embodiments. Also included within the definition are polypeptides which contain one or more analogs of an amino acid (including, for example, non-naturally occurring amino acids, amino acids which only occur naturally in an unrelated biological system, modified amino acids from mammalian systems, etc.), polypeptides with substituted linkages, as well as other modifications known in the art, both naturally occurring and non-naturally occurring.

Predictive Crystallization Function

In one embodiment, the method described uses a predictive function capable of predicting positive outcomes for crystallization and solubility and/or stability, based on an incomplete yet representative sampling of the entire crystallization space (or the permutation space). That is, based on the initial screen conditions and the results produced thereby, the predictive function can perform a virtual screen of all possible combinations and levels of the values for the condition variables to predict the conditions likely to yield larger and higher quality crystals and beneficial solubility and/or stability conditions. This process can further improve the efficiency of protein crystallization screening experiments and solubility and/or stability screening experiments by learning from prior experimental results and predicting new conditions that should produce positive outcomes for crystallization of a crystallant of interest and solubility and/or stability for a polypeptide of interest. The B parameter may be used as a crystallization condition variable to be used by the predictive crystallization function or may be used to validate predicted positive and predicted negative outcomes generated by the predictive crystallization function. In addition the B parameter may be used independently to predict solution conditions that generate beneficial solubility and/or stability conditions.

In one embodiment, the predictive crystallization function is created by a neural network and/or smart algorithm. Neural networks are based upon a real nervous system paradigm composed of multiple neurons communicating through axon connections. Characteristics of neural networks include self-organization, nonlinear processing, and massive parallelism. The neural network exhibits enhanced approximation, noise immunity, and classification properties. The self-organizing and predictive nature of the neural networks allow for accurate prediction of never before seen crystallization conditions, even in the presence of noise. Such neural networks may also be used to generate common crystallization conditions for protein classes.

The operation of the neural net may be combined with a high-throughput automated liquid dispenser that physically creates the customized conditions for each sample and an automated system to monitor the results of the crystallization screens described herein (an exemplary system is described in U.S. patent application Ser. No. 10/665,453). A neural network and/or a smart algorithm according to the present disclosure provides a novel understanding of the highly nonlinear crystallization process, thereby reducing the number of required experiments, and needed quantities of experimental samples. The reduction in the time required to create crystallization conditions (recipes) speeds the structure-based drug design cycle or other crystallization related activities. An exemplary neural net method is described herein. Any neural net algorithm may be used, including those described in U.S. patent application Ser. No. 10/665,453.

Operative predictive crystallization functions illustratively include a trained neural network, a Chernov algorithm, a Bayesian type algorithm (Bayesian nets, Bayesian Classification, Bayesian Decomposition), a Mahalanobis distance, a Gram-Schmidt algorithm and cluster analysis. An operative neural network generates a predictive crystallization function that looks for patterns in training sets of data, learns these patterns, and develops the ability (i.e. produces a function) to correctly classify new patterns and/or makes forecasts of predicted outcomes (both positive and negative). The neural network is trained with initial crystallization screen conditions and results, where said initial crystallization screen samples the entire crystallization space. The conditions for the initial crystallization screen may be determined by any method desired, such as but not limited to, an initial incomplete factorial screen and a random screen. In one embodiment an incomplete factorials screen is used. The user-defined crystallization condition variables of the incomplete factorial become the independent training variables. The outcome or score of the initial crystallization screen become the dependent variables. The dependent and independent variables are used to train the neural network to predict the outcomes of crystallization for a crystallant of interest from the entire crystallization space even though only about 0.1% of the crystallization space is initially tested. Typically, less than 5% of the crystallization space is tested; often less than 1% is tested, and in many instances, less than 0.1% is tested.

Spatial correlation template matching between the responses of different proteins to the same screen may provide a spatial distance relationship score. The correlation yields a distance score between two proteins. As a measure of how well a protein correlates to a second protein crystallization score, a distance function can be used between the two proteins. The index i represents each experimental sample, for example 360 different conditions, i=1 to 360. The distance function compares the response of the protein to each screen condition. If the response is identical, the resultant spatial value becomes 1. If the response is different, the resultant spatial value becomes 0. The correlation between the two proteins then becomes the sum of the resultant spatial values. Alternatively, real multiplication can be assigned for comparisons, i.e. if Protein 1 responds with large crystals to experimental sample 241 and Protein 2 responds with small crystals to experimental sample 241, the resultant spatial value could become much higher than 1. If a crystal is scored as 1000, then the resultant score of crystals at the same condition in two proteins becomes 1000 times 1000, or 1,000,000. The classification system is organized by comparing every protein on a one-by-one basis to other proteins. Neighborhoods and families are then organized by relative closeness.

The neural network as described may be trained by a variety of methods known in the art and described herein. In one embodiment, the neural network is trained, by back propagation, using the results from an initial crystallization screen. Training a neural network begins by finding linear relationships between the inputs and the output of the training set. Weight values are assigned to the links between the input and output neurons. The weight values may be defined by the user and can be varied. After those relationships are determined, neurons are added to a hidden layer so that nonlinear relationships can be found. Input values in the first layer are multiplied by the weights and passed to the hidden layer. Neurons in the hidden layer produce outputs that are based upon the sum of weighted values passed to these neurons. The hidden layer passes values to the output layer in the same fashion, and the output layer produces the desired predicted outcomes. The weights may be adjusted to minimize the error and maximize $R^2$ between the actual versus the predicted values. This process is continued until the average error across all the training sets is minimized. The network "learns" by adjusting the interconnection weights between layers. The predicted outcomes the network is producing are repeatedly compared with the correct answers (i.e. actual results), and each time the connecting weights are adjusted slightly in the direction of the correct answers. Additional hidden neurons may be added to capture features in the data set. Eventually, if the problem is learnable a stable set of weights evolves and produces good answers for all of the sample decisions or predictions. The real power of an inventive the neural network is evident when the trained network is able to produce good results for data that the network has never evaluated to predict the conditions that produce crystals from the entire experimental crystallization space or beneficial solubility and/or stability conditions from the entire permutation space.

Screening for Crystallization Condition Variables

The process described below is described in terms of crystallization determinations; however, the methods are equally applicable to determining solubility and/or crystallant conditions. The typical procedure used to determine proper crystallization conditions for a crystallant of interest (in this embodiment a polypeptide) involves running one or more crystallization screens. A number of crystallization screens are known in the art. Some of the commercially available crystallization screens include those available from Hampton Research, Emerald Biosystems and Jenna Systems. All of the available commercial crystallization screens are linear or sparse matrix screens with a majority of the screening conditions centered around conditions that produce crystals for other proteins. Therefore, if the polypeptide of interest requires unique crystallization conditions to produce crystalline material, use of the commercially available crystallization screens is likely not to produce successful results. Furthermore, if these commercial screens do in fact yield crystals they are often of poor quality and unsuitable for structure solution. If the screens do not yield crystalline material suitable for diffraction studies, the researcher simply tries additional commercial screens, a process that is labor-intensive (even with high-throughput systems), and expensive.

After the results of the crystallization screen are analyzed, the best conditions identified are selected for optimization. Optimization is usually performed by experimentally preparing a linear grid screen that varies only one or two variables such as the pH or precipitating agent in a small region around the best conditions identified in the crystallization screen.

However, historically in analyzing the crystallization screens only positive results are recorded and negative outcomes discarded, so the majority of outcomes observed (such as, but not limited to, clear drop, phase change, precipitate, and spherulites) are never used to determine optimization conditions. In one embodiment of the present disclosure, a set of crystallization condition variables are selected for a particular crystallant of interest to be crystallized. A subset of these variables is used to prepare an initial crystallization screening experiment. The number of conditions in the subset comprising the initial crystallization screen is less than the permutation number for the experiment and the subset is chosen to sample the entire crystallization space for the crystallant of interest. A number of methods may be used to select the variables in the initial crystallization screening experiment, such as, but not limited to, incomplete factorial screens and random screens. Each variable may have one or more specific values to be tested (for example the variable may be pH, with 4 pH values being tested for the pH variable). The variables may be selected as is known in the art. The values of each of the variables, when multiplied together, represent the permutation number for a particular crystallization experiment for the crystallant of interest (i.e. defines the crystallization space for the crystallant of interest). A subset of the values for each of the variables is selected to perform a number of crystallization experiments (representing the initial crystallization screen). The subset of values for the variables in the subset are chosen as is known in the art.

The results of the initial crystallization screen performed are used to train a neural network that will produce a predictive crystallization function, utilizing both successful and unsuccessful outcomes. The predictive crystallization function can then be used to predict the outcome of the remaining experimental crystallization conditions based on the results of the actual experiments of the initial crystallization screen carried out using the subset described above.

The outcomes of the crystallization experiments from the initial crystallization screen are scored prior to being used to train the neural network that will produce the predictive crystallization function. A scale is used that includes scores for various crystalline, quasi- and non-crystalline results. The scale may be linear or non-linear and may be weighted to favor successful conditions (those producing crystals) or non-successful conditions (those not producing crystals). A matrix to encode the variables of the crystallization screen may be used. In one embodiment, the matrix is a user defined incomplete factorial program. A screen size was chosen to be 360 experiments with 10 variables at 6 or 3 values each. Screen size may be varied if desired. Screen variables were chosen according to previously published work and as discussed herein (Carter and Carter, 1979).

In one embodiment, three different complementary approaches have been combined; (i) an initial crystallization screen comprising an incomplete factorial screen; (ii) a high-throughput nanoliter crystallization robot and monitoring system (described in U.S. patent application Ser. No. 10/665, 453); and (iii) a neural net algorithm program capable of using initial screen results to predict future conditions likely to yield crystals. The incomplete factorial screen allows a small number of experiments to be performed that sample all possible experiments in a statistically robust manner (a more complete description is provided in DeLucas, et al. 2003 and in U.S. patent application Ser. No. 10/665,453). Such an integrated approach minimizes the total amount of protein and labor required to screen for suitable crystallization conditions. The following describes selected examples of the present disclosure.

EXAMPLE 1

In one application of the teachings of the present disclosure, the 9C9 (*C. elegans* protein), was examined. In a specific embodiment the B parameter may also be used. The B value may be determined by any method known in the art. In one embodiment the B parameters may be determined by the high throughput device disclosed herein. The B parameter may be input into the neural network to train the neural network. In this example, the initial crystallization screen comprised 360 screen conditions selected using an incomplete factorial design. Experiments were performed on all 360 screen conditions. The neural network was trained using experiments 1-315 from the complete set of 360 screen conditions. The neural network was trained with all results, including failures, of the 315 experiments to train a neural network to recognize conditions that result in crystallization. The 315 experiments allowed the neural network to converge with an acceptable $R^2$ value (goodness of fit) of 0.604. The scoring system was a non-linear scale with any crystalline result given a mark of 1000 and the other results (i.e. clear drop, phase separation, precipitate, microcrystal/precipitate, and rosettes/spherulites) were scored 1 through 5, respectively. The input to the neural network is the indexed crystallization condition variables and the output is the predicted score. The weights of the hidden neurons were determined by back propagation. The remaining 12.5% (45 experiments) of the incomplete factorial screen results were used for verification.

Figure 2:
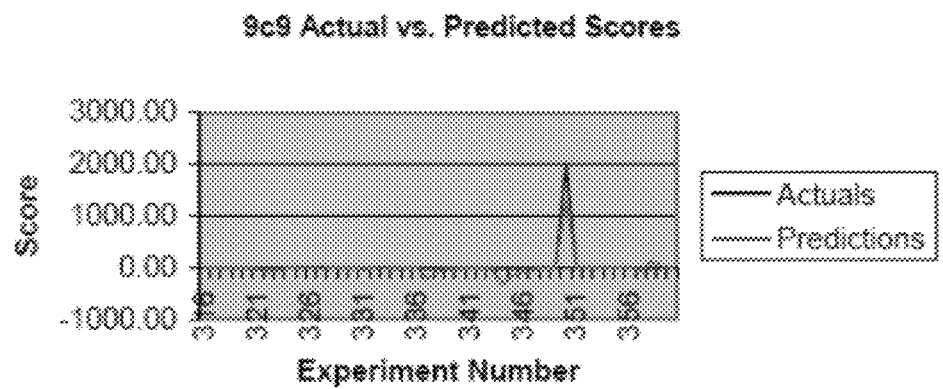
FIG. 2 illustrates a comparison of the crystallization scores between predicted and actual experiments using the data the trained 9c9 the neural network has not been exposed to in order to validate the neural network training process.

There was only one crystal producing condition in the training set of 315 experiments (experiment 239) as shown in FIG. 1. The results from the actual experiment are represented as a dark line and those from the predicted experiment using the neural network are displayed as a lighter line as indicated. The score or result from a protein crystallization experiment (Y axis) versus the crystallization experiment (X axis) is displayed. Experiments 316-360 were used to verify the training of the neural network and are shown in FIG. 2. The score or result from a protein crystallization experiment (Y axis) versus the crystallization experiment (X axis) is displayed. FIG. 2 illustrates the trained neural network was able to predict the only crystallization outcome in experiments 316-360 (experiment 350). This result highlights the neural networks ability to recognize crystallization conditions for 9C9. The neural network was able to accurately predict the outcomes of the remaining 45 experiments, even though results from these experiments had never been input into the neural net program. This analysis reinforces the hypothesis that the neural network can be used to predict crystallization conditions for previously non-crystallized proteins (DeLucas et al, 2003).

The ability of the neural network to identify patterns of crystallization in complex non-linear datasets provides a powerful method of optimization. The total number of permutations possible for a particular screen is calculated by multiplying the number of discrete values of each crystallization condition variable. For the C. elegans protein, 9C9, there are 320,050 possible permutations in the complete crystallization space.

Figure 3:
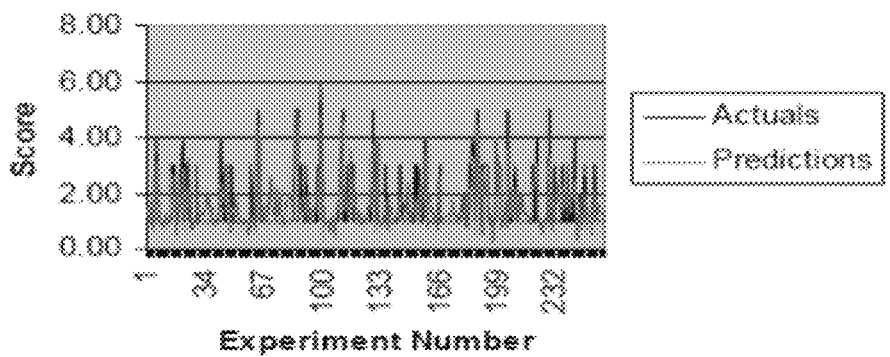
FIG. 3 shows a typical data set obtained when the score values used for neural network training are not weighted.

If actual scores are used for training instead of weighting specific crystal outcomes (as was done for 9C9), noise in the predictions may be observed, such as false positives and false negatives. However, the neural net was able to consistently predict the highest scores, in spite of the inclusion of false positives. FIG. 3 shows a typical training pattern observed when all scores are given equal priority to initiate the training of the neural network. In most cases, the highest predicted values closely match the highest experimental values.

EXAMPLE 2

In an alternate embodiment, a different technique was used to train the neural network. In this embodiment, the data from the initial crystallization screen (the incomplete factorial design as in example 1) was divided into ten (10) disjointed and unique folds such that each crystallization condition of the incomplete factorial screen was used to train the neural network nine (9) times and for an independent evaluation of the model during a 10th iteration. For each of the 10 folds, 90% of the data was used for training and the remaining 10% was completely withheld from the training process and evaluated only after all training was completed. The neural net algorithm randomly selected the 10% of the data withheld during each iteration. During each iteration, the neural network learned by the training data how to predict crystallization conditions likely to produce crystals. At the start of each iteration, all of the data from the incomplete factorial screen is again used for the training of the neural network and the evaluation. This process gave 10 separate algorithms that captured the variation in the data. The final algorithm developed was used as a consensus of all the predicted values taken as an average. In a further variation, the iterative training process can be continued as described above until the neural network ceases to improve its predictive ability with further training The standard deviation (sigma) was also calculated as an estimate of the probability of accuracy for an individual prediction. Once the training of the neural network was complete, all possible combinations of the variables (~320,000 in this case) were calculated representing the non-sampled complete factorial space (i.e. predicting the conditions that produce crystals from the entire "crystallization space"). The highest 1000 maximum predicted values were identified and sorted based on the minimum standard deviation and represented the neural network's prediction of the optimal crystallization conditions. In this example, 360 conditions (representing the entire incomplete factorial screen) were used to train neural network which then predicted the outcomes of the non-sampled complete factorial space to identify crystallization conditions (i.e. predicting the conditions that produce crystals from the entire "crystallization space"). The crystallization conditions for the top 360 scores (the number 360 was chosen due to the fact that the corning crystallization plate holds 120 conditions and the neural net algorithm predicted scores for three different temperatures) were determined and the experiments conducted. These selections represented the neural net's choice for the top 360 conditions from 320,000 possibilities for each protein. In an effort to independently compare the modified training algorithm with the algorithm produced using back-propagation, Interactive Analysis (Bedford, Mass.) also performed all consensus model neural network calculations using back propagation as described above. The results of the two independent analyses were highly correlated, with the top 20 predictions in close agreement.

EXAMPLE 3

In this example eleven proteins were subjected to the incomplete factorial screen followed by neural net analysis as described. The proteins used included C. elegans-9C9, C. elegans-11059, variable chitin binding protein-3 (VCBP-3), beta lactoglobulin (bovine milk), α-chymotrypsinogen (bovine pancreas), catalase (bovine liver), collagen binding protein (ACE-40), bacterial hyaluronidase, TSP-1, PA1 and PX1 (identification of these two proteins is confidential at the request of the pharmaceutical company that contributed them to our studies).

For each protein, an initial crystallization screen was prepared using an incomplete factorial screen. The results of which were used to train a neural network as described herein. The results of the initial crystallization screen were used to train the neural network as described in example 2. The neural network used the data from the initial crystallization screen to predict conditions favorable for crystallization (positive outcomes) for each protein.

Figure 4:
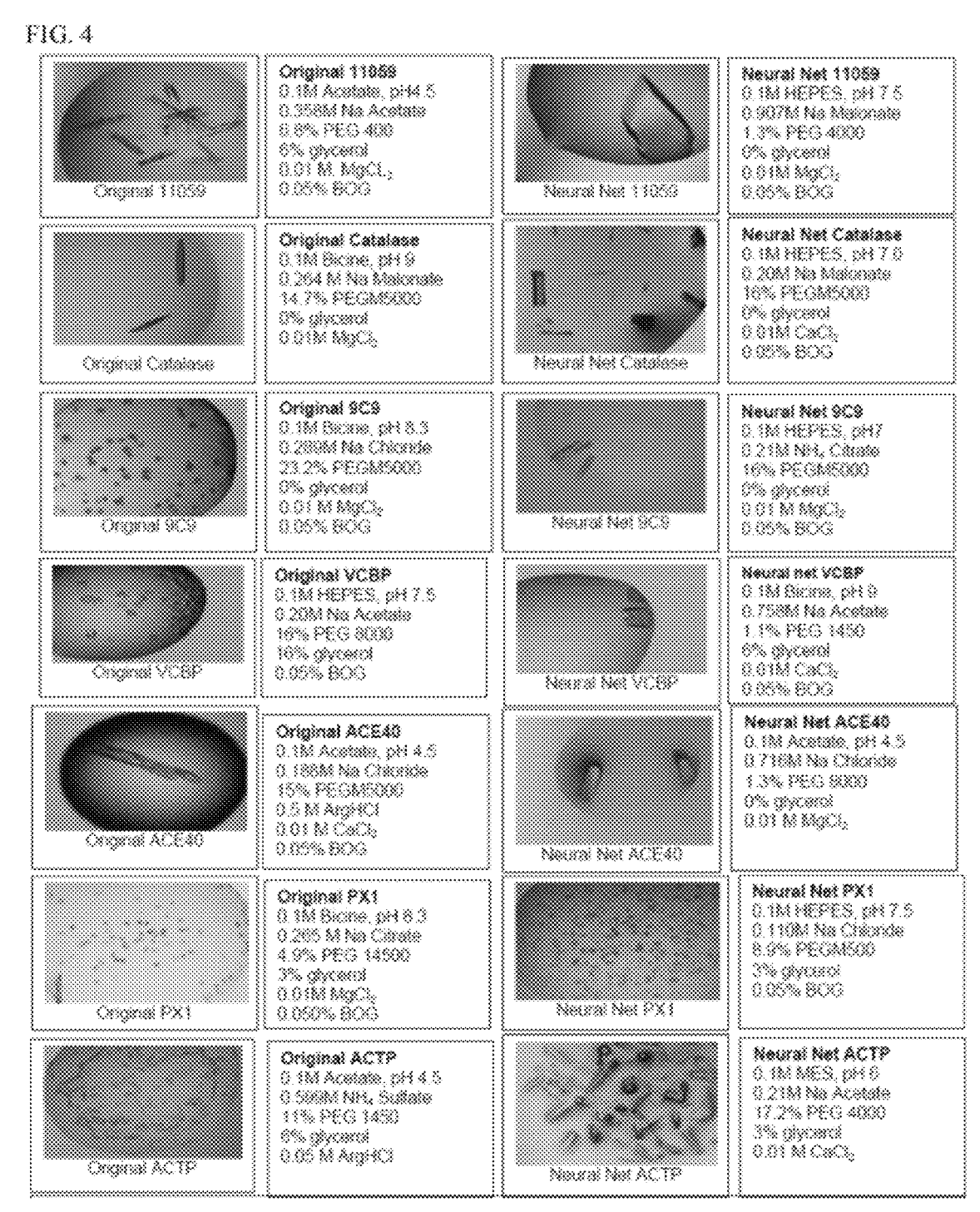

The neural net predictive scores for each protein generally ranged between one to three units higher than any of the input scores used for training Thus, the neural net was able to use the training data (initial crystallization screen) to weight those factors determined to be important for optimum crystallization results and subsequently predict new conditions expected to produce improved results. Neural net predictive capabilities were compared with linear regression as an alternative method to predict crystallization outcomes. In every case, the neural net was superior to the linear regression algorithm. In some cases the neural net predictions appeared to fall into an area that would be described as part of the region around the initial "crystallization hit". Thus, if an experimenter prepared a fine screen around the initial hit, (without help from the neural net predictions) the improved conditions would also have been found. However, for other proteins (C. elegans 11059, VCBP-3 and ACE-40) this clearly was not the case. In these cases, the predictions from the neural network involved an area of "crystallization space" that was significantly different from the crystallization outcomes observed in the initial crystallization screen that would not have been explored in a second round of finer screening. The pH's differed by 3.0 units from the conditions in the initial crystallization screen and used completely different salts and concentrations. For example, it is unlikely that a crystallographer, given the initial conditions identified in the initial screen would have identified the conditions for crystallization predicted by the neural network. FIG. 4 shows crystals and chemical conditions obtained from the initial screen (best hit from initial screen) versus the best experimental results obtained via the neural net predictions with all experiments conducted in the exact same way (i.e. drop size, temperature, container volume etc.). In some instances the neural net predictions yielded experimental results (crystals) scoring as high as a 10 (one large, high quality crystal) using the Hampton scoring system.

There are two traditional methods used to optimize crystallization based on the results of an incomplete factorial screen. One is to proceed directly to a fine screen centered close to the conditions that produce crystals, maintaining a narrow range of pH and concentration variables. Usually the identities of the PEG's and anionic salt components would remain constant. A second approach would be to use a linear prediction method to analyze the overall results to determine the best value for each variable. For example, if the average score of experiments containing malonate is higher than the average score for the other salts, malonate would be selected as the anionic salt.

The neural net analysis predicts high scores for many experiments in the areas of the original screen hits and also included most of the experiments suggested by the linear analysis. Larger and better quality crystals were found for the majority of the proteins screened among the experiments suggested by the neural net analysis rather than those in the original screen (as well as those suggested by the linear analysis). In almost all cases, the linear regression predictive analysis experiment either failed to predict conditions that led to crystals, or the crystals were of poorer quality than the original hits.

These results imply that a predictive algorithm, such as the neural network described herein, may be useful for optimizing the fine screening that is typically required to advance from initial hits to diffraction-quality crystals. But it may also be useful for finding new permutations of the components and their concentrations that also yield superior crystals yet lie far outside the area that would normally be subjected to a fine screen (this area may produce crystals with new space groups or morphologies).

The use of a statistically representative crystallization screen (the incomplete factorial screen) may provide an advantage over commercially available screens, particularly for those proteins that crystallize under experimental conditions that are uncommon. In addition, the use of such a screen with predictive algorithms may provide a powerful tool for crystallizing and optimizing new proteins. The incorporation of these tools with a nanoliter dispensing system enables an efficient and intelligent search for the optimum crystallization conditions.

B Parameter

It is well established both experimentally and theoretically (George and Wilson, 1994; Ducruix et al., 1996; Malfois et al., 1996; Rosenbaum et al., 1996; George et al., 1997; Neal et al., 1998; Bonnete et al., 1999; Neal et al., 1999) that a dilute solution thermodynamic parameter called the second virial coefficient, referred to herein as B, is correlated to solution conditions that are favorable to protein crystallization. Originally determined for lysozyme and bovine serum albumin, B showed a narrow range of values that correlated with protein crystal growth. Generally, the B values that correlate with protein crystal formation are in the range between $-1 \times 10^{-4}$ and $-8 \times 10^{-4}$ mol ml g$^{-2}$ (sometimes referred to as the "crystallization slot"). B is a measure of the entirety of two body (protein-protein) interactions that includes contributions from excluded volume, electrostatic factors (attractive and repulsive) and hydrophobic interactions. In terms of MacMillan-Meyer solution theory, B is related to a potential of mean force, W, which describes all of the interaction forces between two protein molecules in dilute solution. Protein crystal growth experiments conducted in solution conditions at more negative B values have a greater risk of forming amorphous solid phase (which are not useful for crystal structure determination) because of corresponding stronger protein-protein attractions. On the other hand, experiments at more positive values, where the net protein-protein interactions are repulsive, typically require protein concentrations that are impractically high to cause phase separation of any kind Solvent conditions resulting in crystallization can be referred to as being "moderately poor", i.e. the solvent must be poor enough (slightly negative B values) to eventually promote the formation of crystals at higher protein concentrations but not so poor (larger negative B values) that it results in the formation of amorphous precipitate.

The B parameter can be used as an effective guide by crystallographers to determine changes in one or more values of the crystallization condition variables of the crystallization solution, such as but not limited to, the selection of precipitating agent, the selection of buffer, the selection of pH, the selection of temperature, light, magnetism, gravity, atmosphere identity, atmospheric pressure, the selection of divalent anion, organic moment and the selection of additional additives to aid in crystallization that will increase the probability of a successful crystallization. In addition the B parameter may be used independently to determine solution conditions that generate beneficial solubility and/or stability conditions. Such a use is possible since the B parameter evaluates protein-protein interactions which are a key determinant in polypeptide solubility/stability as well as for crystallization. By determining which combinations of values of the crystallization condition variables fall within the crystallization slot, the probability of an unsuccessful outcome is reduced. The crystallization slot is applicable for both water-soluble and membrane bound proteins (Hitscherich et al. (2000)). In addition to aqueous proteins and protein-detergent complexes, B measurements on protein-free detergent micelles found that the B is a good predictor for crystallization of protein-detergent complexes under similar solution conditions (Loll et al. (2002)).

There are a number of methods for determining B values. Any method for measuring B values, now known or discovered in the future, may be used in the context of the present disclosure. The most often reported method of determining B values is by static light scattering (SLS). The basic SLS experiment measures the average intensity of light scattered by a protein solution of defined concentration in excess of that scattered by background sources (solvent, crystallizing agents, such as detergents, stray light, etc.). A complete description of the SLS experiment and theory is given by Kratochvil (Classical Light Scattering from Polymer Solutions, Elsevier, Amsterdam, 1987). As the term implies, SLS can be used to obtain the so-called "static" parameters of the protein such as weight-average molecular weight, Mw, and B. The working equation appropriate for most protein molecules is $$\frac{Kc}{R_{90}} = \frac{1}{M_w} + 2Bc + \Lambda \tag{1}$$

where K is an optical constant. $R_{90}$ is the excess Rayleigh factor at a scattering angle of 90° (cm$^{-1}$) and c is the concentration of the protein (g/mL). Equation (1) indicates that a plot of Kc/R$_{90}$ versus c allows the determination of Mw (usually independently known for a carefully purified protein), and B, the second virial coefficient. The values for B resulting from these measurements may then be used as input to the predictive crystallization function or to validate the predicted positive and negative outcomes generated by the predictive crystallization function.

Although SLS is commonly used to determine the B value, the use of SLS in high throughput methods has certain disadvantages due to sample clarification procedures, amount of protein required (mg), time of measurement (hrs) and data interpretation for multi-component solutions. In order to overcome previously mentioned obstacles for B determinations, a novel alternative approach has been devised to determine B values for soluble proteins as well as membrane proteins. In one embodiment, the method for determining B is a special case of affinity chromatography, often referred to as self-interaction chromatography (SIC) (Patro, S. and Przybycien, T., Biotechnol. Bioeng. 52, 193-203, 1996) and is performed when the target protein is used as both ligand (attached to a stationary phase) and ligate (soluble in the mobile phase). SIC utilizes a stationary phase that consists of the crystallant of interest (in this case a polypeptide) immobilized on the support material, and a mobile phase that consists of the crystallization solution (which can be varied to screen for various crystallization conditions) and the polypeptide of interest dissolved in the crystallization solution. The mobile phase (comprising the dissolved polypeptide of interest) is then injected onto the column, the retention time is measured and the retention time of the polypeptide of interest ($t_R$) is compared to that of a neutral marker ($t_m$). For different crystallization solutions, the polypeptide of interest dissolved in the mobile phase will have different interactions (repulsive/attractive) with the stationary phase polypeptide of interest, leading to shifts in retention times. Recent publications (Tessier, et al., 2002) have proven that the retention time of the polypeptide of interest dissolved in the mobile phase is correlated with B. These same properties allow the B parameter to predict beneficial solubility and/or stability conditions for a polypeptide of interest.

The application of SIC to determinations of B was described (Garcia, et al., 2003a; Garcia, et al., 2003b) and is described in U.S. patent application Ser. No. 10/265,715. In the '715 application, a SIC device was fabricated comprising a channel formed in a channel layer. A cover may be placed over the channel formed in the channel layer to form a cavity. The channel and/or the cover comprise a first and second opening in fluid communication with the channel. The cavity comprises a solid support containing the immobilized polypeptide of interest. The channel may have any diameter desired. In one embodiment, the volume of the channel is less than 100 ul; in an alternate embodiment, the volume of the channel is less than 10 ul. The device described may be used in combination with a fluid handling system to direct a fluid (i.e. the mobile phase) through the cavity. The fluid handling system may be a fluid pump in fluid communication with the first and/or second openings described above. The fluid handling system directs the fluid through the channel so that the dissolved polypeptide of interest in the mobile phase interacts with the immobilized polypeptide of interest on the solid support. As discussed above, the mobile phase may be a crystallization solution having the desired values of the crystallization condition variables so that a wide variety of crystallizations conditions may be tested. An injector may be provided for injecting the polypeptide of interest into the fluid stream. Furthermore, a detector may also be provided in fluid communication with the first and/or second openings to detect the presence of the polypeptide of interest in the fluid stream.

Once the stationary phase is fully equilibrated by pumping a particular mobile phase through the channel, a small volume (0.2 μl of a dilute (~1.0 mg/ml) solution of protein dissolved in the mobile phase is injected into the fluid stream. The detector measures the retention time of the polypeptide of interest ($t_R$). The $t_R$ is compared to that for a neutral (non-interacting) marker ($t_m$). The process is repeated for different concentrations of the crystallizing agent, and a chromatographic capacity factor, k', is computed from each retention time. The k' values were then used to directly estimate the B parameter. k' is determined as set forth in equation 2:

$$k' = \frac{t_r - t_m}{t_m} \quad (2)$$

where $t_r$ is the retention time measured for the polypeptide of interest and $t_m$ is the retention time for an unretained marker. The $t_m$ may be determined as set forth above for the ESA protein, or by a two-step method as follows. First, a column is prepared using the same stationary support material without the polypeptide of interest immobilized thereon. Acetone (3% v/v) and the marker protein are injected on this column and the retention times ($t_{ace'}$ and $t_{prot'}$) measured. Acetone (3% v/v) is injected on a column with immobilized protein and the retention time measured ($t_{ace}$). $t_m$ is determined by multiplying using equation 3:

$$t_m = t_{ace} \frac{t'_{prot}}{t'_{ace}} \quad (3)$$

This step is necessary to account for the size-based retention of the protein on the stationary phase. B measurements may also be directly obtained from k'. Tessier et al. (2002) recently published a quantitative relationship between B and k':

$$B = \left(B_{HS} - \frac{k'}{\phi \rho}\right) \frac{N_A}{M^2} \quad (4)$$

where $B_{HS}$ is the hard sphere contribution to the virial coefficient, i.e. the protein excluded volume (calculated from the protein molecular weight), φ is the surface coverage of the immobilized protein (molecules/unit area), ρ is the available surface area, which can be experimentally determined using the method of DePhillips and Lenhoff (2000), M is the molecular weight, and $N_A$ is Avogadro's number. Using this simple relation k' can be converted directly to B.

SIC experiments circumvent the usual difficulties encountered with SLS for B determinations. First, the tedious solution clarification procedures prerequisite for SLS are not required for SIC. A simple tabletop centrifugation step for the protein stock and the buffer/crystallizing agent solvent is sufficient for SIC. Second, the quantity of protein required for a single determination of B by SIC can be as little as 37 ng (Garcia, et al., 2003b) compared to near mg quantities required for SLS. Third, at a flow rate of 2 μL/min the protein eluted from the channel in ~7 minutes so that a single B measurement can be made in just a fraction of the time required for SLS. Fourth, the presence of detergent micelles in the mobile phase has no measurable effect on detection of the eluting protein so that estimation of B values by SIC for membrane proteins is straightforward in comparison to the SLS approach.

EXAMPLE 4

Figure 5:
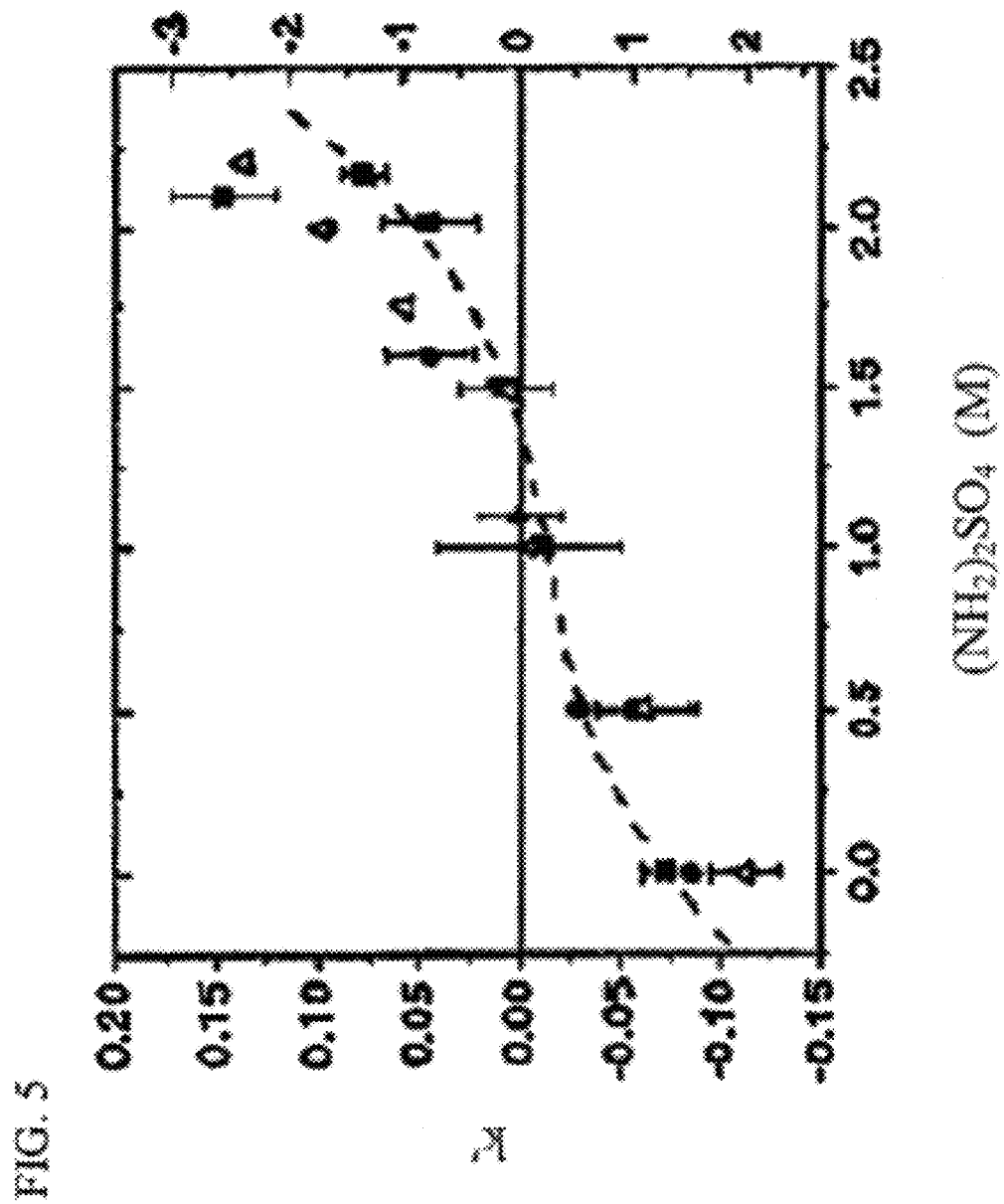
FIG. 5 shows a comparison of k' measured using SIC and B measured by SLS for the ESA protein.

The validity of the SIC method to determine B for equine serum albumin (ESA) was evaluated as a function of the ammonium sulfate concentration in HAc/NaAc 0.1 M, pH 5.6. To calculate k', the ESA retention time obtained at 1.4 M $(NH_4)_2SO_4$ was taken to be the value for $t_m$ (retention time, marker) because at these conditions the B value is very close to zero indicating no net protein-protein interactions. The data are plotted in FIG. 5 and compared with the SLS results (solid elements represent the k' values and open elements represent B values). A good correlation between k' and B was obtained. An increase in the crystallizing agent concentration enhances protein-protein interactions so that the B values becomes more negative and the corresponding $t_{Resa}$ (retention time, ESA) and k' values increase. As discussed above, while conventional SIC can accurately measure B, it requires significant amounts of protein. The SIC method described herein can be used with significantly less amounts of protein.

EXAMPLE 5

Figure 6:
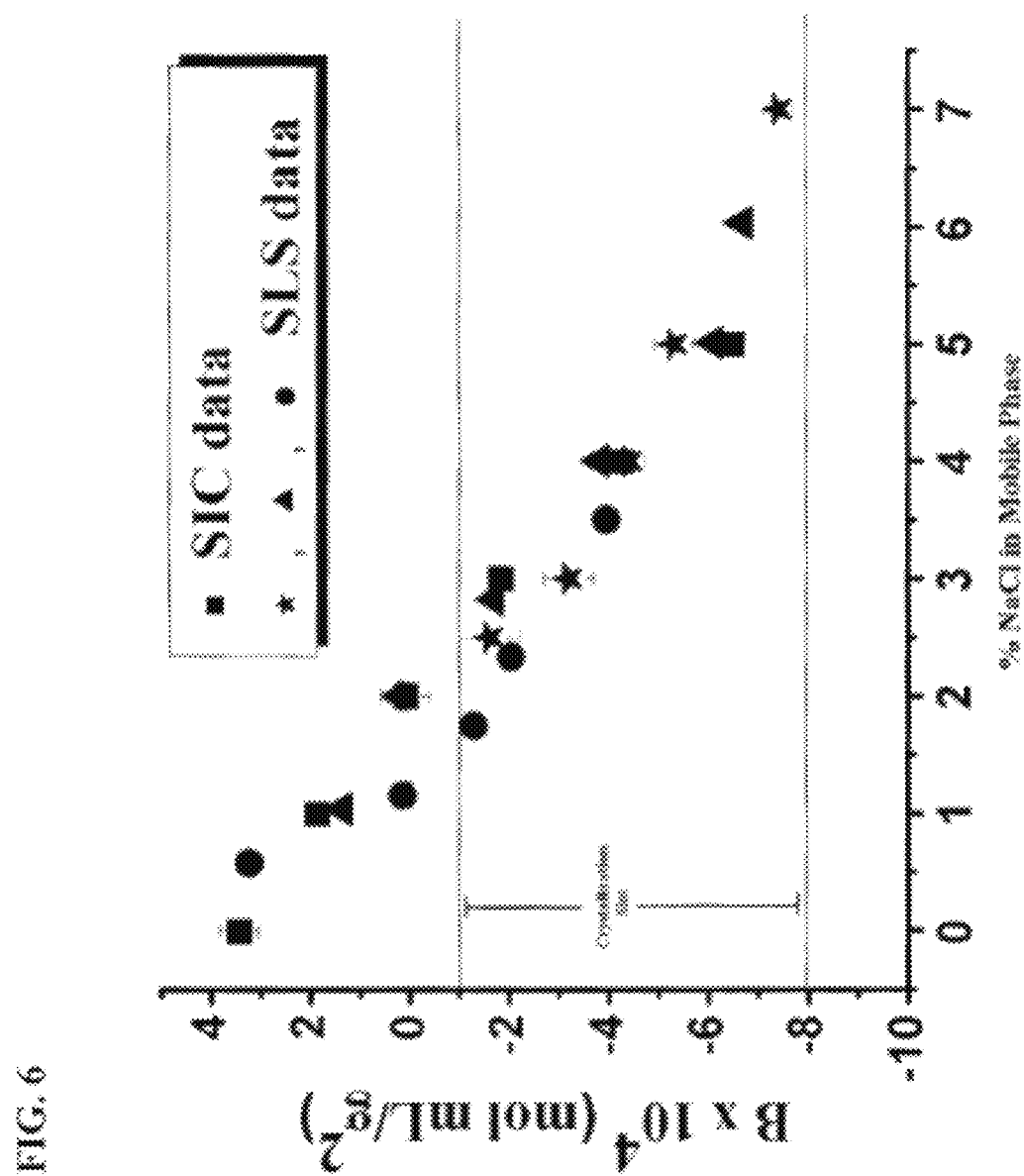
FIG. 6 shows a comparison of SIC and SLS for lysozyme as a function of % NaCl in the mobile phase (pH 4.5, 0.1 M acetate base mobile phase, $\lambda_{det}=280$ nm).

In one specific embodiment, a micro-fluidic device to determine B was fabricated from polydimethylsiloxane (PDMS) with a channel dimensions of 50 mm L×250 μm W×127 μm H. The stationary phase consisted of the polypeptide of interest covalently linked to Toyopearl AF-Tresyl-650M chromatography beads (Tosoh Biosep) which was low pressure packed into the channel of the device. The mobile phase consisted of a buffer with an added crystallizing agent for the polypeptide of interest. Validating experiments were performed with two proteins: (i) lysozyme with a mobile phase consisting of 0.1M sodium acetate buffer, pH 4.2 and sodium chloride as crystallizing agent; and (ii) equine serum albumin with a mobile phase consisting of 0.1M sodium acetate buffer, pH 5.6 and ammonium sulfate as crystallizing agent. FIG. 6 shows a comparison of B values collected using the microfluidics device (using SIC) as described herein with B values determined via SLS (using lysozyme as an example; similar results were obtained with ESA). The excellent correlation between these two data sets demonstrates the ability to accurately convert k' to B.

EXAMPLE 6

The potential of the a neural network to predict positive outcomes (i.e., a set of conditions that results in a crystallization event) is significantly improved if an information-rich phenomenological parameter, such as the B parameter, is used as an additional input for the predictive crystallization function in addition to the empirical crystallization outcomes determined from the initial crystallization screen and/or as a method to validate the predicted positive and negative outcomes generated by the predictive crystallization function. To demonstrate the power of the B parameter to improve the ability of a predictive crystallization function to identify positive outcomes, the B parameter was determined by SLS and applied to the predicted positive outcomes generated for α-chymotrypsinogen protein in order to determine whether the B parameter could identify false positive results in the predicted positive outcomes.

Figure 7:
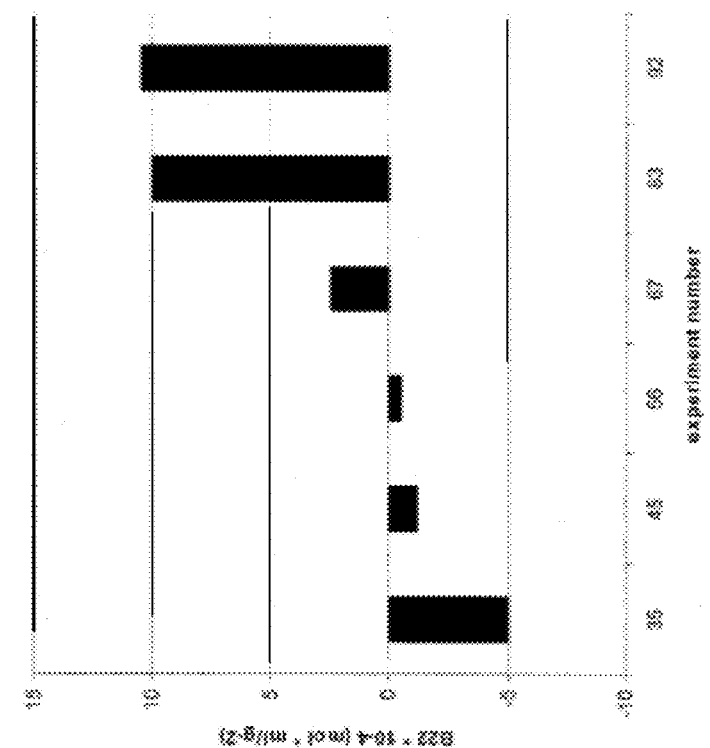
FIG. 7 illustrates the use of the second virial coefficient data as an aid in determining desired crystallization conditions for the α-chymotrypsinogen protein.

In this example, the crystallization condition variables for the α-chymotrypsinogen protein were determined. The crystallization condition variables were subject to an incomplete factorial screen to sample the entire crystallization space in order to generate an initial crystallization screen containing 360 conditions as set forth in Example 1 and this disclosure. The initial crystallization screen was performed as would be known to one of skill in the art. The independent (crystallization condition variables) and the dependent variables (crystallization outcomes and the B parameters) were used to train a neural network as set forth in Example 2. The trained neural network then generated predicted positive outcomes for the α-chymotrypsinogen protein from the complete crystallization space based on the results of the initial crystallization screen. FIG. 7 shows that the neural network generated 6 sets of conditions that were predicted to result in a positive outcome (experiments 35, 45, 56, 67, 83 and 92). However, when experiments were performed using the crystallization conditions for the 6 sets of conditions predicted to have positive outcomes, only 3 of these sets of conditions yielded positive outcomes (experiments 35, 45 and 56) while the remaining 3 sets of conditions yielded negative results (experiments 67, 83 and 92). Therefore the crystallization conditions embodied in experiments 67, 83 and 92 were false positives and the crystallization conditions in experiments 35, 45 and 56 were true positives.

The B parameter was determined for the conditions of experiments 34, 54, 56, 67, 83 and 92. The determined B values were then applied to the predicted positive outcomes generated by the neural network. As can be seen in FIG. 7, the neural network's true positive predictions fell within the crystallization slot as determined by the B parameter, while the false positives fell outside the crystallization slot for the B parameter. The corresponding table in FIG. 7 provides the predicted and actual (experimental) scores for each of the six predicted positive outcomes. Although the predicted scores for the false positives were all above seven, the actual experimental results for the false positives yielded no scores higher than one. Therefore, the B parameter correctly identified the true positive results and identified the false positive results with 100% accuracy. Other information-rich phenomenological parameters such as, but not limited to, polydispersity, isoelectric point, amino acid content, may also improve the algorithm predictive ability.

As demonstrated in Example 6, B is a powerful predictor of positive crystallization outcomes generated by a neural network.

EXAMPLE 7

In this example, the ability of the disclosed methods to predict the B parameter (second virial coefficient) is reported. In this example, the initial screen consisted of 81 experimental conditions, with condition variables including excipient/additive type and concentration, buffer type and pH, temperature, salt type and ionic strength and for membrane proteins, detergent type and concentration plus additional additives such amphiphiles (i.e. heptane-triol, 1,2 heptane-diol, etc.) The initial conditions were chose by an incomplete factorial screen as described herein. In this example, the purpose was to identify conditions for protein solubility and stability. The proteins may be membrane bound or soluble.

Figure 10:
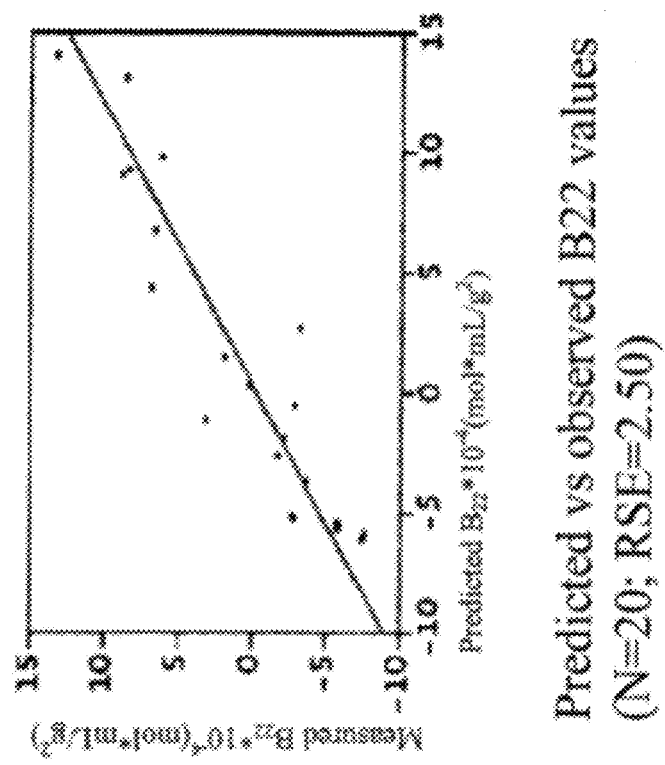
FIG. 10 shows the neural network of the present disclosure is capable of predicting solution conditions that generate B values that result in beneficial solubility or stability conditions for a polypeptide of interest.

As shown in FIG. 10, the neural network successfully predicted B values for a combination of the incomplete factorial screen variables. This example demonstrates that a neural network of the present disclosure that is trained on B values from an initial screen can accurately predict solution conditions in which the protein of interest exhibits high solubility and stability indicated by more positive B values (which as discussed above are useful in preparing protein samples for future crystallization trials). Independent of the application to determining positive outcomes for crystallization, the ability to predict B parameters is helpful in determining conditions in which proteins of interest will be soluble and stable in a given solution. The rapid and accurate identification of such conditions is of interest to developers of protein and polypeptide therapeutics where high concentrations or the protein/polypeptide therapeutic are required, yet the protein sample must remain stable (i.e., long "shelf life") without incurring unwanted nonspecific protein aggregation.

In this example, the protein lysozyme was used to demonstrate the ability of the neural net to accurately predict B values both within and outside the defining limits of the experimental screen. SIC was performed on the eighty-one screen conditions with each condition measured in triplicate (for a total of 243 SIC measurements) using a high precision Shimadzu HPLC. The experimental data served as the training set and was used by the neural network in an iterative approach where the condition variables represented the independent variables and the B values represented the dependent variables. The neural network randomly deletes 10% of the experiments from the training set, with the deleted experiments being evaluated after training of the neural network with the training set. As discussed herein, the neural network evaluates its ability to predict B values for the removed data set and subsequently readjusts the weighting for each input and nonlinear function in the array using back propagation as described herein. This process is iterated until the difference between the predicted and experimental values for the removed data set reaches a minimum.

After training, the validity of the trained neural network to predict conditions outside the eighty-one initial screen conditions was evaluated. As FIG. 10 shows, there is excellent correlation between the observed and predicted B values for twenty conditions randomly chosen and not in the original screen. This result shows that the neural network of the present disclosure can rapidly and accurately predict B values for unknown experimental conditions, once it is trained as described herein. The value of combining this technology with the self interaction chromatography system is that, from a small number of screen conditions (determined by the incomplete factorial screen), a user is able to predict solutions (including its chemical components and their concentrations) that provide optimized stability and solubility for a polypeptide of interest. Such a method has not been appreciated in the art and will be useful in protein expression research as well as for determining optimal formulations for the delivery of protein/polypeptide therapeutics, including but not limited, to vaccine therapeutics.

However, in order to be useful for such applications, a high throughput method for determining B is required. Although the above discussed features of SIC make it ideally suited for use in determining B, a high throughput device for the efficient determination of the B parameter has not been reported. The device described in the '715 application was not suited for high throughput use as the device contained a single cavity (testing one sample at a time) and could not be reused with a different polypeptide of interest without destroying the device. A high throughput method for determining B values is therefore needed for determining multiple B values for use with predictive crystallization functions and/or to validate the predicted positive and/or negative outcomes of the predictive crystallization functions. For use in this manner, the B parameter for hundreds of conditions would need to be determined in a short time with minimal use of the polypeptide of interest. The following section describes an inventive high throughput device for determining the B parameter.

Therefore, the present disclosure describes an improved process for determining crystallization conditions for a polypeptide of interest. In one embodiment, the crystallization condition variables are selected for the polypeptide of interest. The crystallization conditions are selected based on the polypeptide of interest and such selection is within the ordinary skill of the art in the field. The exact nature of the crystallization condition variables is not critical to the present disclosure and the methods of the present disclosure may be used with essentially any set of crystallization condition variables.

After the crystallization condition variables are determined, an initial crystallization screen is prepared to sample the entire crystallization space defined by the crystallization condition variables. In one embodiment, the initial crystallization screen is produced using an incomplete factorial screen as described herein; in an alternate embodiment, the initial crystallization screen is prepared using a random screen. Other methods for producing the initial crystallization screen may be used as well. In one embodiment, the initial crystallization screen comprises at least 100 conditions, at least 250 conditions, or at least 500 conditions. In a specific embodiment, the initial crystallization screen comprises 360 embodiments.

Crystallization experiments are prepared using the conditions of the initial crystallizations screen. The outcomes of the crystallization experiments are noted. The outcomes of the crystallization experiments may be scored by any method known in the art or as described herein or may be used without scoring. The crystallization condition variables for each condition are the independent variables and the outcomes of the crystallization experiments are the dependent variables. In addition, the B parameter may be determined for each condition of the initial crystallizations screen. When determined, the B parameter is also a dependent variable and may be used to train the neural network.

The independent and dependent variables are input into a predictive crystallization function and used to train a predictive crystallization function as described herein. In one embodiment, the predictive crystallization function is a neural network. The trained predictive crystallization function then predicts both positive and negative outcomes for the remaining conditions in the crystallization space as defined by the crystallization condition variables. The positive outcomes may then be further evaluated. In one embodiment, the B parameter is determined for each predicted positive outcome generated by the predictive crystallization function. The B parameter may then be used to validate the predicted positive and negative outcomes as described in Example 6. In one embodiment, if the B parameter determined for a given positive predicted outcome falls outside of the crystallization slot, then the predicted positive outcome has a high probability of being a false positive.

In the above embodiment, the B parameter may be determined by any means available in the art. In an alternate embodiment, the B parameter is determined using a high throughput device as described in this specification (see FIGS. 8-9).

SIC Device

Embodiments of Sic Chip Design

The instrument described may be used to predict B in a high throughput manner in a short period of time with minimal amounts of the polypeptide of interest and may be used with soluble and membrane proteins. The randomization of the buffer constituents and their concentrations (the crystallization condition variables) used in the incomplete factorial screen combined with neural net predictions require that SIC measurements are performed on multiple protein/buffer solutions. In one embodiment, the device will process premixed formulations of protein/buffer in a parallel design built around a common modular scheme. In an alternate embodiment, the device will utilize a premixing chamber to prepare the required buffer constituents for delivery.

The device will be able to make hundreds of B parameter determinations on the time frame of hours using a minimum amount of the polypeptide of interest. In one embodiment, the device is designed so that a retention time ($t_R$) of the polypeptide of interest can be determined in less than 8 minutes, meaning that total run times will be on the order of 12 minutes. Under these conditions, the B parameter for a typical 360 condition incomplete factorial screen could be determined in approximately 72 hours. The use of parallel determinations of B would further reduce this time, as described below.

In one embodiment, the device is designed so that 10 or 20 B determinations can be made at one time, which would reduce the time required to make 360 B determinations to less than one day. A device designed to make 40 B determinations at one time would reduce this time to less than 2 hours.

Figure 8A:
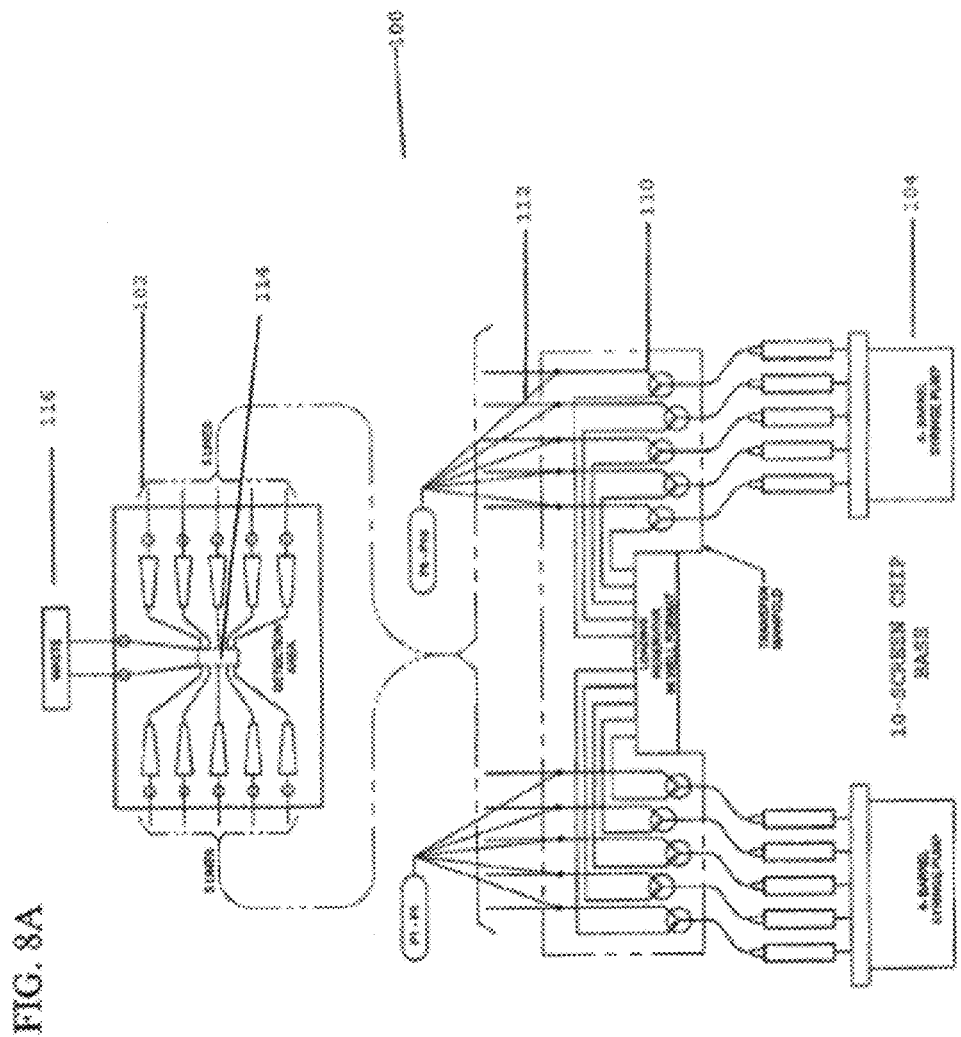
FIG. 8A shows one embodiment of a SIC device comprising 10 channels.

FIG. 8 shows several embodiments of a device according to the present disclosure. In FIG. 8A the device 100 is designed to make 10 B determinations at one time using 10 distinct micro-fluidic modules 102. The microfluidics modules 102 may constructed as described herein and comprise a channel containing a solid support secured to the polypeptide of interest for SIC determinations of B. In this embodiment, the device 100 comprises a multi-barrel syringe pump 104 which loads each loads the polypeptide of interest in a predetermined buffer solution (comprising the mobile phase) from a loading reservoir 106 (which may be a micro-titer plate or similar reservoir) through a transfer manifold 108. A single loading reservoir is used to shorten the fluid path (reducing dead volume) and add the flexibility of using two multi-barrel syringe pumps to reduce the starting pressure on the fluid lines to the chip. A three-way valve 110 at each syringe port on the transfer manifold directs each screen into the syringe through 5 parallel channels 112; a signal switches the valve(s) to inject the mobile phase into the micro-fluidic device through 10 parallel lines (P1-P10). Individual pressure sensors at the transfer manifold outlets monitor each line for an over pressure condition and shuts off the syringe pump if this occurs. The screen enters each micro-fluidic device 102 containing the polypeptide of interest secured to the solid support and the output is monitored with a detector 114, such as, but not limited to, a CCD measuring the fluorescence intensity in each channel. In one embodiment each microfluidics device has a dedicated detector 114. The mobile phase containing the polypeptide of interest may be collected in a waste reservoir 116 where the polypeptide of interest may be recovered if desired.

Figure 8B:
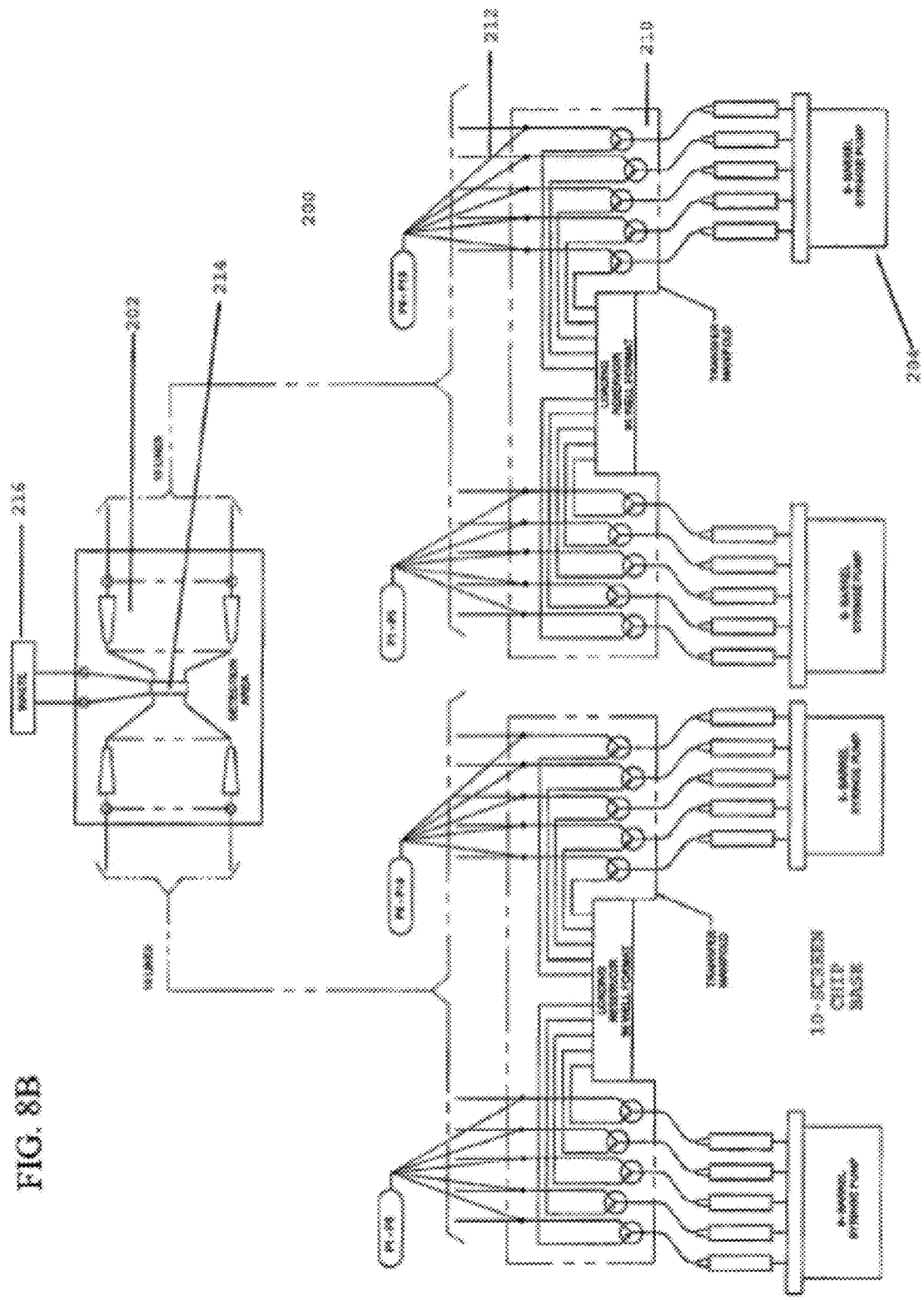
FIG. 8B shows one embodiment of a SIC device comprising 20 channels

FIG. 8B illustrates an alternative embodiment of the device, designated 200. In this device, two of the device 100 are placed in a parallel configuration and can for use determining 20 B determinations at one time. The device 200 operates as described above for device 100. The modular packaging allows the expansion of SIC capability to expand the number of B determinations as desired by the user. The 20-screen chip will operate essentially as described above.

Figure 9A:
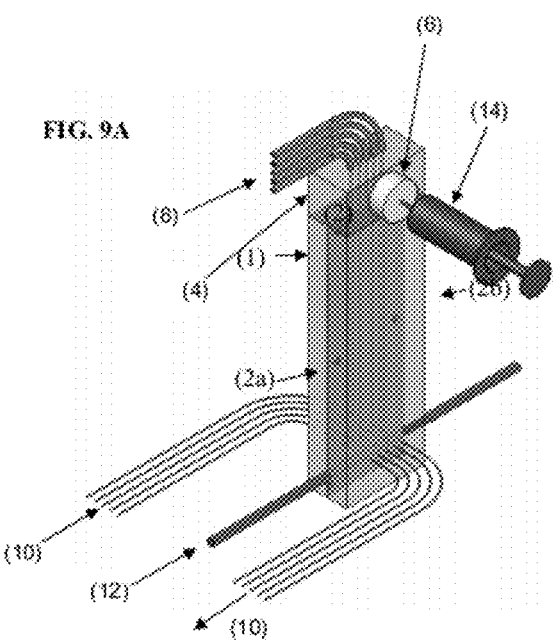
FIG. 9A shows a side perspective view of one embodiment of a micro-fluidic device used in the determination of the B parameter.
Figure 9B:
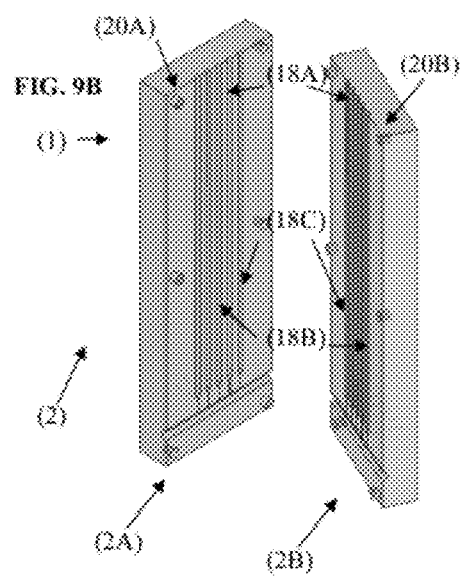
FIG. 9B shows an exploded view of a portion of the micro-fluidic device of FIG. 9A.
Figure 9C:
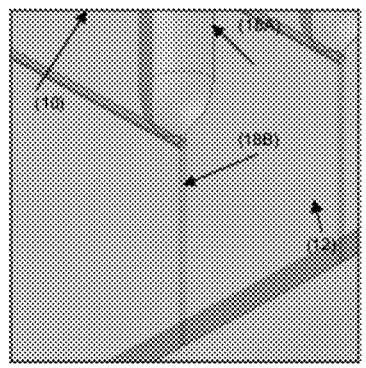
FIG. 9C shows a side magnified view of a portion of the micro-fluidic device of FIG. 9A.

FIGS. 9A-C describe a particular embodiment of the microfluidics module (designated generically as 102 and 202 above). As shown in FIGS. 9A and 9B, the micro-fluidic module-1 comprises a casing 2, the interior of which defines multiple channels 18 in its interior. In the embodiment illustrated, casing 2 is shown as comprising 2 halves, 2A and 2B, which can be reversible mated together to form the final casing 2. The module 1 further comprises a manifold 4 mated to the casing 2 which directs the buffer flow channels 8 into the channels 18, multiple detector channels 10, a waste channel 12, a multi-injection valve 6, and at least one delivery means (14).

FIG. 9B, depicts the micro-fluidic module 1 with the casing 2 separated into its mated parts 2A and 2B with alignment tabs and holes 20A and 20B respectively. As can be seen in FIG. 9B, the channels 18 comprise a first channel portion 18A and a second channel portion 18B. The first channel portion 18A is wider than the second channel portion 18B and forms a neck 18C where the first channel portion 18A and the second channel portion 18B meet. The neck 18C serves to restrain the immobile phase secured to the polypeptide of interest from passing through channel 18. In one embodiment the width of the first channel portion 18A is from 1000 to 4000 microns and the width of the second channel portion 18B is from about 25 to 100 microns. In a specific embodiment, the width of the first channel portion 18A is 2000 microns and the width of the second channel portion 18B is 50 microns. The length of channel 18 may be from about 6 to 12 cm. The length of the channel 18 may be selected to provide consistent retention times ($t_R$) for the polypeptide of interest depending on the flow rate and other variables. The dimensions of the channel 18 may be selected so that the total volume of the channel 18 is about 10 to 500 ul; in a specific embodiment, the total volume of the channel 18 is about 100 ul.

Figure 9D:
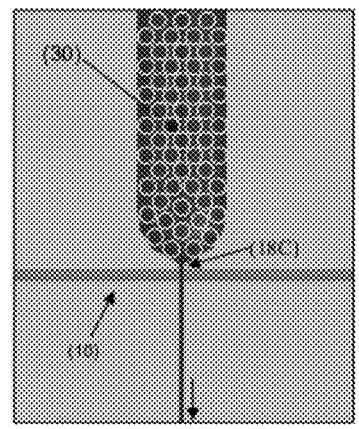
FIG. 9D shows a front magnified view of a portion of the micro-fluidic device of FIG. 9A.

FIGS. 9C and 9D further illustrates a single channel 18 showing the neck 18C and a single detector channel 10 (the solid support 30 is omitted from FIG. 9C for clarity). As shown in FIGS. 9C and 9D, as the buffer (i.e., the mobile phase) elutes from the channel 18 (illustrated here just below the neck 18C), the mobile phase passes in front of detector channel 10. In this embodiment, each detector channel 10 transmits light from a light source through the path defined by detector channel 10 to a detector (not shown). When the polypeptide of interest is contained in the mobile phase, the light transmitted by detector channel 10 will be modulated as is known in the art. This modulation is detected by the detector which then determines the time at which the polypeptide of interest elutes from the device 1 (which is the retention time, $t_R$, of the polypeptide of interest). The k' values and the B parameter may be calculated from the retention times of the polypeptide of interest and the marker protein as described herein. The mobile phase, with the polypeptide of interest, is collected in a waste reservoir as described.

Optimization of Protein Immobilization

Use of the device requires that the polypeptide of interest be secured to a solid support for placement in the channels of the device. In principle, there are many ways in which the polypeptide of interest may be secured to the solid support and any method known in the art may be used. The methods used to secure proteins of interest to a solid support can be divided into two general categories, namely covalent attachment, in which amino acid side chains are coupled to a chemically activated solid support, and noncovalent attachment, in which specific tags are captured specifically by an appropriately derivatized solid support.

Covalent attachment of proteins to solid supports has been practiced for decades (Turkova, 1999). A large variety of derivatized resins are commercially available that are activated for coupling to different amino acid side chains, notably lysine $\epsilon$-amino groups, serine hydroxyls and cysteine thiols, and the carboxylate groups of aspartate and glutamate. The chemistry is robust and a variety of linker arms of different lengths and chemistries are available. An advantage of covalent attachment is that it is likely to lead to random orientation of the target protein on the surface of the bead, because multiple amino acid attachment sites will be available on the surface of both aqueous and membrane proteins. Such random orientation is desirable because it will allow proteins in the mobile phase to interact with all faces of the immobilized proteins.

With regard to noncovalent attachment, many schemes are also known and may be used. In one embodiment, avidin/biotin chemistry is used. Biotin will be chemically coupled to amino acid side chains on the surface of the polypeptide of interest, and then these biotinylated proteins will be immobilized using avidin (streptavidin and neutravidin can also be used) linked to the solid support. Because this is a solution phase reaction, biotinylation can be easily driven to completion by adjusting the concentration of the coupling reagent. Therefore, this approach can be performed in small volumes and will only consume minute quantities of protein. At the same time, two of the principle advantages associated with covalent attachment chemistry are retained, namely 1) the immobilization of the protein is essentially irreversible, and 2) the protein will be randomly oriented on the surface of the solid support, because biotinylation can occur at multiple sites on the protein surface.

Matrices containing immobilized avidin are commercially available, but they typically employ Sepharose beads, which are quite soft and cannot withstand the pressures that will be generated during the rapid chromatographic runs (using 65 micron beads in the channels, pressures of 100-200 psi are observed; smaller bead sizes will result in even higher pressures). TosoBiosep beads may be prepared using avidin. Three bead chemistries can be used; formyl, amine, and tresyl. For the tresyl beads, in one embodiment, avidin is immobilized by mixing the beads with avidin and cyanoborohydride and allowing them to react for 2 hrs at room temperature. The amount of immobilized avidin will be determined by measuring the UV absorbance of the avidin solution before and after immobilization. Remaining active sites on the particles will be capped with amine-terminated polyethylene glycol (PEG) using the same procedure. The bead size can be selected as desired. In on embodiment, 65-micron TosoBiosep beads are selected. Large and small bead sizes may be selected and intermixed if desired. For the sake of clarity any solid support known in the art may be used.

Channel Packing and Protein Immobilization

In one embodiment, channels will be packed with the solid support (such as for example, the bead systems described above) using a low-pressure slurry packing method (Garcia et al. 2003). Particles are held in place in the channel by the neck described above. The larger solid support (selected to be greater in diameter than the width of the second channel portion) cannot penetrate beyond the neck and are retained physically. In an alternate embodiment, for smaller particles, the keystone effect generates an effective non-mechanically induced neck. The keystone effect results from an increase in particle concentration at the narrow opening and subsequent precipitation of particles. The keystone effect has been previously applied for microcolumn packing (Ceriotti et al. 2002).

Once columns are packed, the polypeptide of interest is immobilized using avidin-biotin interactions. An appropriate amount of the polypeptide of interest is first biotinylated using a commercially available kit (Pierce). Biotinylated protein will be flowed over the immobilized streptavidin stationary phase and allowed to bind. The immobilization efficiency will be determined by measuring the protein in the column eluent. Remaining avidin sites may be capped with short chain biotinylated PEG to reduce non-specific protein-surface interactions. If the initial immobilization density is not sufficient for SIC measurements with a continuous flow through measurement, stopped flow immobilization will be used.

The examples are not intended to limit the scope of the appended claims to the illustrative materials and conditions detailed herein. One skilled in the art will readily appreciate that the present invention is well adapted to carry out the objects and obtain the ends and advantages mentioned, as well as those inherent therein. It will be apparent to those skilled in the art that various modifications and variations can be made in practicing the present disclosure without departing from the spirit or scope of the invention. Changes therein and other uses will occur to those skilled in the art which are encompassed within the spirit of the disclosure as defined by the scope of the claims. Any patents or publications mentioned in this specification are indicative of the levels of those skilled in the art to which the disclosure pertains. These patents and publications are herein incorporated by reference to the same extent as if it was indicated that each publication was incorporated specifically and individually by reference.

Literature Cited

Ay, J., Gotz, F., Borriss, R., Heinemann, U., 1998. Proc. Natl. Acad. Sci. USA 95, 6613-6618.

Baker, H. M., Day, C. L., Norris, G. E., Baker, E. N., 1994. Acta Crystallogr. D 50, 380-384.

Betton, J. M., Jacob, J. P., Hofnung, M., Broome-Smith, J. K., 1997. Nat. Biotechnol. 15, 1276-1279.

Bonnete, F., Finet, S., Tardieu, A., 1999. J. Cryst. Growth 196, 403-413.

Brush, M 2001. The Scientist 15[9]:25.

Campbell, J. W., Duee, E., Hodgson, G., Mercer, W. D., Stammers, D. K., Wendell, P. L., Muirhead, H., Watson, H. C., 1972. Cold Spring Harbor Symp. Quant. Biol. 36, 165-170.

Carter Jr., C. W., Carter, C. W., 1979. Biol. Chem. 254, 12219-12223.

Ceriotti, L., R. de and E. Verpoorte 2002. Anal Chem 74(3): 639-47.

Charron, C., Kern, D., Giege, R., 2002. Acta Crystallogr. D 58, 1729-1733.

Chen, P., Tsuge, H., Almassy, R. J., Gribskov, C. L., Katoh, S., Vanderpool, D. L., Margosiak, S. A., Pinko, C., Matthews, D. A., Kan, C. C., 1996. Cell 86, 835-843.

D'Arcy, A., Stihle, M., Kostrewa, D. A., Dale, G., 1999. Acta Crystallogr. D 55, 1623-1625.

Dale, G. E., Broger, C., Langen, H., D'Arcy, A., Stuber, D., 1994. Protein Eng 7, 933-939.

Davis, S. J., Brady, R. L., Barclay, A. N., Harlos, K., Dodson, G. G., Williams, A. F., 1990. J. Mol. Biol. 213, 7-10.

DeLucas, Lawrence J. Terry L. Bray, Lisa Nagy, Debbie McCombs, Nikolai Chernov, David Hamrick, Larry Cosenza, Alexander Belgovskiy, Brad Stoops, and Arnon Chait, 2003. J. Structural Biology, 142:188-206.

DeLucas, L. J., David Hamrick, Larry Cosenza, Lisa Nagy, Debbie Powell, Terry Bray and Arnon Chait, 2005. Progress in Biophys. and Mol. Biol., 88:285-309.

DePhillips, P. and A. M. Lenhoff. 2002. J. Chromatogr. A 883 (1-2), 29-54.

Duda, R. O., Hart P. E., Stork D. G. 2001. Wiley, New York

Ducruix, A. Guilloteau, J., Ries-Kautt, M., Tardieu, A. 1996. J. Cryst. Growth 168, 28-39.

Garcia, C., Holman, S., Henry, C., Wilson, W. 2003a. Biotechnol. Prog. 19, 575-579.

Garcia, C. DeGail, J., Wilson, W., Henry, C. 2003b. Biotechnol. Prog. 19, 1006-1010.

Garcia, C. D., D. J. Hadley, W. W. Wilson and C. S. Henry 2003. Biotech. Prog. 19: 1006-1010.

George, A. and Wilson, W. 1994. Acta Cryst. D50, 361-365.

George, A., Chiang, Y., Guo, B., Arabshahi, A., Cai, Z., Wilson, W. 1997. Methods Enzymol 276. 100-110.

George, A., Wilson, W., 1994. Acta Crystallogr. D 50, 361-365.

Gottschalk, I, Lagerquist, C., Zuo, S. S., Lundquist A., Lundahl, P. 2002 J. Chromatogr B 202, 768, 31-40.

Goulding, C. W., Perry, L. J., 2003. J. Struct. Biol. 142, 133-143.

Grueninger-Leitch, F., D'Arcy, A., D'Arcy, B., Chene, C., 1996. Protein Sci 12, 2617-2622.

Hitscherich, C., Kaplan, J., Allaman, M., Wiencek, J., Loll, P. 2000. Protein Science 9, 1559-1566.

Jancarik, J., Kim, S.-H., 1991 J. Appl. Crystallogr. 24, 409-411.

Kostrewa, D., Grueninger-Leitch, F., D'Arcy, A., Broger, C., Mitchell, D., van Loon, A. P. G. M., 1997. Nat. Struct. Biol. 4, 185-190.

Kratochvil, P. 1987. Classical Light Scattering from Polymer Solutions, Elsevier, Amsterdam.

Krupka, H. I., Rupp, B., Segelke, B. W., Lekin, T. P., Wright, D., Wu, H.-C., Todd, P., Azarani, A., 2002. Acta Crystallogr. D 58, 1523-1526.

Lawson, D. M., Artymiuk, P. J., Yewdall, S. J., Smith, J. M., Livingstone, J. C., Treffry, A., Luzzago, A., Levi, S., Arosio, P., Cesareni, G., 1991. Nature 349, 541-544.

Longenecker, K. L., Garrard, S. M., Sheffield, P. J., Derewenda, Z. S., 2001. Acta Crystallogr. D 57, 679-688.

Loll, P. Hitscherich, C., Aseyev, V. Allaman, M., Wiencek, J. 2002. Cryst. Growth and Design 2, 533-539.

Loll, P. J. 2003. J. Struct. Biol, 142(1), 144-153.

Luft, J. R., Wolfley, J., Jurisica, I., Glasgow, J., Fortier, S., DeTitta, G. T., 2001. J. Cryst. Growth 232, 591-595.

Malfois, M., Bonnete, F., Belloni, L. Tardieu, A. 1996. J. Chem. Phys. 105, 3290-3300.

Mateja, A., Devedjiev, Y., Krowarsch, D., Longenecker, K., Dauter, Z., Otlewski, J., Derewenda, Z. S. 2002. Acta Crystallogr. D 58, 1983-1991.

McElroy, H. E., Sisson, G. W., Schoettlin, W. E., Aust, R. M., Vallafranca, J. E. 1992. J. Cryst. Growth 122, 265-272.

McPherson, A., 1982. Preparation and Analysis of Protein Crystals. Wiley, New York.

Nagi, A. D., Regan, L., 1997. Fold Des 2, 67-75.

Neal, B., Asthagiri, D., Lenhoff, A. 1998. Biophys. J. 75, 2469-2477.

Neal, B., Asthagiri, D., Velov, O., Lenhoff, A., Kaler, E. 1999. J. Cryst. Growth 196, 377-387.

Nugent, P. G., Albert, A., Orprayoon, P., Wilsher, J., Pitts, J. E., Blundell, T. L., Dhanaraj, V., 1996. Protein Eng 9, 884-893.

Oefner, C., D'Arcy, A., Hennig, M., Winkler, F. K., Dale, G. E., 2000. J. Mol. Biol. 296, 341-349.

Ostermeier, C., Harrenga, A., Ermler, U., Michel, H., 1997. Proc. Natl. Acad. Sci. USA 94, 10547-10553.

Patro, S., Przybycien, T. 1996. Biotechnol. Bioeng. 52, 193-203.

Prongay, A. J., Smith, T. J., Rossmann, M. G., Ehrlich, L. S., Carter, C. A., McClure, J., 1990. Protein Eng 7, 933-939.

Rosenbaum, D., Zamora, P., Zukoski, C. 1996. Phys. Rev. Lett. 1, 150-153.

Segelke, B. W., Rupp, B., Lekin, T. P., Krupka, H. I., Azarani, A., Todd, P., Wright, D., Wu, H.-C. 2002. Acta Crystallogr D58, 1523-1526.

Stevens, R. C., 2000. Curr. Opin. Struct. Biol. 10, 558-563.

Tessier, P., Lenhoff, A., Sandler, A. 2002. Biophys. J. 82, 1620-1631.

Thompson, M. J., Eisenberg, D., 1999. J. Mol. Biol. 290, 595-604.

Turkova, J. 1999. J. Chromatogr B 722, 11-31.

Waldo, G. S., Standish, B. M., Berendzen, J., Terwilliger, T. C., 1999. Nat. Biotechnol. 17, 691-695.

Zhou, H. X., Hoess, R. H., DeGrado, W. F., 1996. Nat. Struct. Biol. 3, 446-451.

What is claimed:

1. A method for generating a predicted positive crystallization condition for a crystallant of interest, the method comprising the steps of:
    (a) conducting an initial crystallization screen on the crystallant of interest, the initial crystallization screen comprising a plurality of crystallization conditions, each of the crystallization conditions having one or more crystallization condition variables;
    (b) determining a crystallization outcome for at least one of the crystallization conditions of the initial crystallization screen;
    (c) determining for at least one of the crystallization conditions of the initial crystallization screen a dilute solution thermodynamic virial coefficient (B) parameter;
    (d) inputting a data set into a predictive crystallization function, the data set including information selected from the group consisting of: (i) one or more of the crystallization condition variables for at least one of the crystallization condition of the initial crystallization screen, (ii) the crystallization outcome for at least one of the crystallization condition of the initial crystallization screen, (iii) the B parameter for at least one of the crystallization condition of the initial crystallization screen, and (iv) any combination of the foregoing;
    (e) training the predictive crystallization function using the data set where the training is continued until the predictive crystallization function reaches a suitable convergence; and
    (f) generating the predicted positive crystallization condition for the crystallant of interest using the converged values of crystallization variables in the predictive crystallization function.

2. The method of claim 1 where the predictive positive crystallization condition is not contained in the initial crystallization screen.

3. The method of claim 1 where the crystallization condition variables define a total crystallization space for the crystallant of interest and the crystallization conditions sampling less than 5% of the total crystallization space.

4. The method of claim 1 where the crystallant of interest is selected from the group consisting of a polypeptide, an organic molecule, an organometallic molecule, an inorganic molecule, a nanocrystal, and a virus.

5. The method of claim 4 where the polypeptide is an aqueous polypeptide or a membrane polypeptide.

6. The method of claim 1 where the crystallization condition variables are selected from the group consisting of purity of the crystallant, dilution of the crystallant, homogeneity of the crystallant, stability of the crystallant, flexibility of the crystallant, precipitating agent, concentration of precipitating agent, buffer, concentration of buffer, pH, temperature, light, magnetism, gravity, atmosphere identity, atmospheric pressure, divalent anion, organic moment, additives to aid in crystallization and a combination of any of the foregoing.

7. The method of claim 6 where the crystallization condition variables are further selected from the group consisting of type of lipid present, detergent, concentration of detergent, polar additives, apolar additives, amphipathic additives and a combination of any of the foregoing.

8. The method of claim 3 where the initial crystallization screen comprises less than 4%, less than 3%, less than 2%, less than 1%, less than 0.5% or less than 0.1% of the total crystallization space.

9. The method of claim 1 where the initial crystallization screen is generated using an incomplete factorial screen or a random screen.

10. The method of claim 1 where the predictive crystallization function is a neural network.

11. The method of claim 10 where the neural network is trained through back propagation.

12. The method of claim 1 where the predictive crystallization function is selected from the group consisting of a Chernov algorithm, a Bayesian net, a Bayesian classification, a Bayesian decomposition, a Mahalanobis distance, a Gram-Schmidt algorithm and a cluster analysis.

13. The method of claim 1 further comprising generating crystals of the crystallant of interest using the predicted positive crystallization condition.

14. The method of claim 1 where the B parameter is determined using self-interacting chromatography or static light scattering.

15. A method for generating a predicted positive crystallization condition for a crystallant of interest, the method comprising the steps of:
 (a) conducting an initial crystallization screen, the initial crystallization screen comprising a plurality of crystallization conditions, each of the crystallization conditions having one or more crystallization condition variables;
 (b) determining a crystallization outcome for at least one of the crystallization conditions of the initial crystallization screen;
 (c) inputting a data set into a predictive crystallization function, the data set including information selected from the group consisting of: (i) one or more of the crystallization condition variables for at least one of the crystallization condition of the initial crystallization screen, (ii) the crystallization outcome for at least one of the crystallization condition of the initial crystallization screen, and (iii) any combination of the foregoing;
 (d) training the predictive crystallization function using the data set where the training is continued until the predictive crystallization function reaches a suitable convergence;
 (e) generating the predicted positive crystallization condition for the crystallant of interest using the converged values of crystallization variables in the trained predictive crystallization function; and
 (f) validating the predicted positive crystallization condition using a dilute solution thermodynamic virial coefficient (B) parameter.

16. The method of claim 15 where the validating comprises determining the B parameter for the predicted positive crystallization condition and determining whether the B parameter is within a range that falls inside a crystallization slot.

17. The method of claim 16 where the predicted positive crystallization condition is validated if the B parameter is within a range that falls inside the crystallization slot.

18. The method of claim 16 where the predicted crystallization condition is not validated if the B parameter is not within a range that falls inside the crystallization slot.

19. The method of claim 15 where the B parameter is determined using self-interacting chromatography or static light scattering.

20. The method of claim 15 further comprising generating crystals of the crystallant of interest using the predicted positive crystallization condition that has been validated.

21. The method of claim 15 where the crystallant of interest is selected from the group consisting of a polypeptide, an organic molecule, an organometallic molecule, an inorganic molecule, a nanocrystal, and a virus.

* * * * *